United States Patent
Cai

(10) Patent No.: US 12,491,923 B2
(45) Date of Patent: Dec. 9, 2025

(54) REMOVABLE PULL ROD ASSEMBLY FOR ROLLING TOOLBOX AND THE LIKE

(71) Applicant: Meridian International Co., Ltd, Shanghai (CN)

(72) Inventor: Shujun Cai, Shanghai (CN)

(73) Assignee: Meridian International Co., Ltd, Shanghai (CN)

( * ) Notice: Subject to any disclaimer, the term of this patent is extended or adjusted under 35 U.S.C. 154(b) by 858 days.

(21) Appl. No.: 17/729,717

(22) Filed: Apr. 26, 2022

(65) Prior Publication Data
US 2023/0022470 A1    Jan. 26, 2023

(30) Foreign Application Priority Data

Jul. 15, 2021  (CN) .......................... 202121617644.7

(51) Int. Cl.
*B62B 3/02*     (2006.01)
*B62B 5/06*     (2006.01)

(52) U.S. Cl.
CPC .................. *B62B 3/02* (2013.01); *B62B 5/06* (2013.01); *B62B 2202/12* (2013.01); *B62B 2202/48* (2013.01)

(58) Field of Classification Search
CPC ......... B62B 3/02; B62B 5/06; B62B 2202/12; B62B 2202/48
See application file for complete search history.

(56) References Cited

U.S. PATENT DOCUMENTS

| | | | | |
|---|---|---|---|---|
| 3,522,955 | A * | 8/1970 | Warner, Jr. ............... | A45C 5/14 16/113.1 |
| 5,500,981 | A * | 3/1996 | Ho ........................ | A45C 13/262 280/655 |
| 5,803,214 | A * | 9/1998 | Wang .................... | A45C 13/262 190/115 |
| 5,926,914 | A * | 7/1999 | Kuo ...................... | A45C 13/262 280/655 |
| 7,082,641 | B1 * | 8/2006 | Jung .................... | A45C 13/262 16/113.1 |
| 9,057,552 | B2 * | 6/2015 | Vanderberg ............ | A45C 11/20 |
| 10,383,415 | B1 * | 8/2019 | Graham ............... | A45C 13/262 |

* cited by examiner

*Primary Examiner* — Tri M Mai
(74) *Attorney, Agent, or Firm* — Eversheds Sutherland (US) LLP

(57) ABSTRACT

A fixed rod and a pull rod slidingly engageable in the fixed rod with a plug mounted inside the bottom end of the pull rod and a push button mounted at the bottom of the plug. The push button has a first position and a second position with respect to the plug. When the push button is in the first position with respect to the plug, the pull rod is slidable up and down inside the fixed rod. When the push button is located in the second position with respect to the plug, the pull rod is removable from the fixed rod.

16 Claims, 8 Drawing Sheets

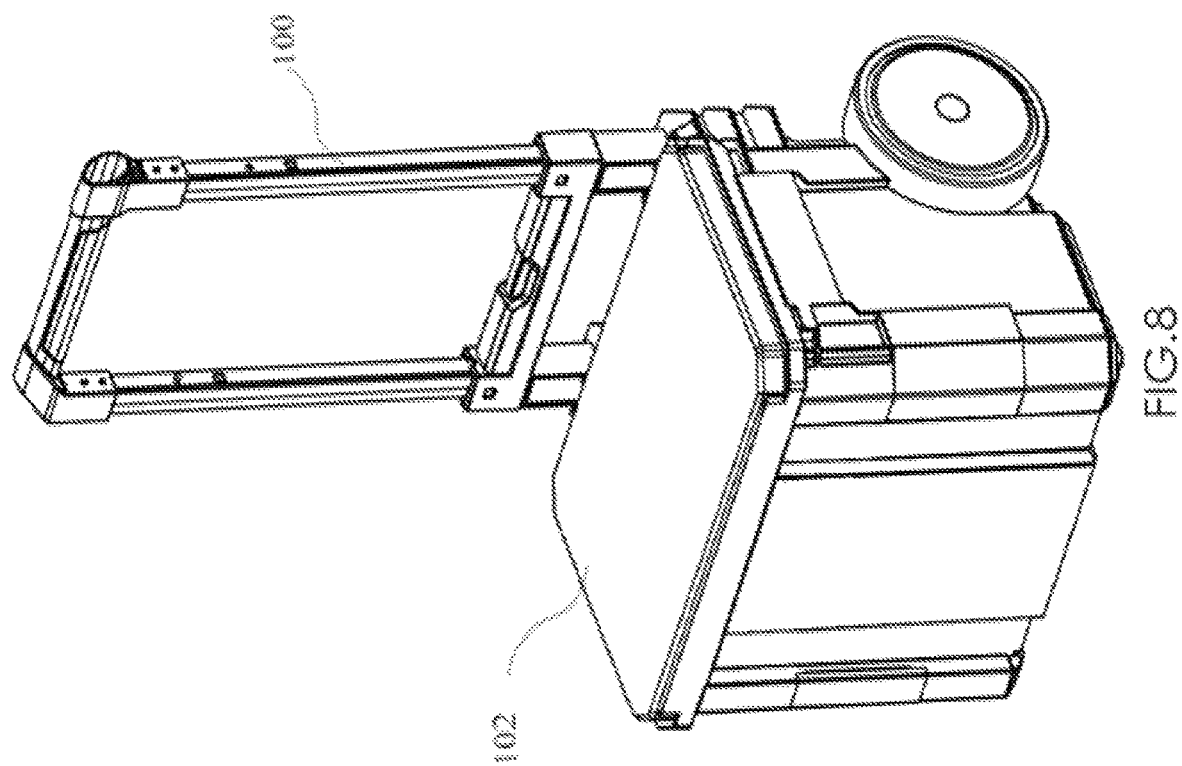

REMOVABLE PULL ROD ASSEMBLY FOR ROLLING TOOLBOX AND THE LIKE

CROSS-REFERENCE TO RELATED APPLICATIONS

The present application claims the benefit of Chinese Patent Application No. 202121617644.7 filed Jul. 15, 2021 which is incorporated herein by reference. The present application also incorporates by reference co-pending non-provisional application titled, A Retractable Pull Rod Assembly for Rolling Toolbox and the like filed concurrently herewith.

TECHNICAL FIELD

The present invention relates to luggage, especially to a trolley and toolbox with a removable structure.

BACKGROUND INFORMATION

In daily life, the toolbox with trolley or luggage trolley assembled after the highest pull-out height and the lowest retraction height of the trolley has been limited. One problem is that the overall height of the trolley is too high. The vast majority of existing toolboxes with trolley bars on the market now can't be placed in the trunk of vehicles with a lower height, such as the trunk of a pickup truck. In many foreign countries, pickup trucks are a very common means of transportation, and pickup truck trunks include a cover used to waterproof and for anti-theft, which greatly limits the height of the items that can be loaded. Most professional maintenance workers are driving pickup trucks to work sites, which means that if you bring a standard toolbox with trolley or pull bar, the pickup truck lid can't be covered.

Accordingly, there is a need for an improved toolbox with trolley or pull bar.

SUMMARY

In view of this, disclosed is a tool box with a pull rod assembly with a removable pull rod, through the cooperation of push button and plug that can be moved inside and outside, so that the push button and the fixed rod form interference or disengagement with the pull rod. The disclosed pull rod is easy to install or when needed to remove the pull rod as a whole to adapt to the height of the car trunk in a simple operation.

Disclosed is a pull rod assembly with a removable pull rod, including a fixed rod, a pull rod slidably engagable in the fixed rod, a plug mounted inside the bottom end of the pull rod, and a push button mounted at the bottom of the plug. The push button has a first position and a second position on the plug. When the push button is in the first position on the plug, the pull rod can only slide up and down inside the fixed rod, and when the push button is in the second position on the plug, the pull rod can be removed from inside the fixed rod.

Further, the bottom of the plug is provided with a transverse U-shaped slot for mounting the push button, and the top of the transverse U-shaped slot is provided with a first fixing slot and a second fixing slot; when the push button is in the first position, the push button snaps to the first fixing slot, and when the push button is in the second position, the push button snaps to the second fixing slot.

Further, the push button comprises an intermediate portion, an offset portion connected to the intermediate portion, protruding from the intermediate portion, a resilient arm disposed within the intermediate portion, and a bump disposed on top of the resilient arm.

Further, the intermediate part is inserted in the transverse U-slot and is capable of sliding laterally relative to the transverse U-slot; when the intermediate part slides along the transverse U-slot to a first position, the bump is seated in the first fixing slot and the butt section protrudes from the transverse U-slot, when the intermediate part slides along the transverse U-slot to a second position, the bump is seated in the second fixing slot and the butt section is retracted in the transverse U-slot.

Further, the push button further comprises an acting portion extending downward and perpendicular to the intermediate portion, the acting portion driving the push button to switch between a first position and a second position.

Further, a cavity is formed within the intermediate portion and the resilient arm is located within the cavity.

Further, the lower part of the fixed rod is provided with an upwardly extending section of sliding groove, and an abutting surface is formed between the sliding groove and the fixed rod; when the push button is in the first position, the pull rod can slide up and down in the sliding groove, and the push button can abut against the abutting surface.

Further, further comprising a crossbar set outside the fixed rod, the crossbar having a button inside, two gears meshing with both sides of the button, two racks meshing with the two gears and a spring connected to the two racks, the button being able to drive the racks to contract inside the crossbar by means of the gears, the racks being able to return automatically by means of the spring, so that the fixed rod and the pull rod are unlocked and locked to each other.

Further, the fixed bar is provided with a second snap slot, the crossbar is provided with a third snap slot, and the pull rod is provided with a plurality of fourth snap slots; when the fixed bar and the pull rod are interlocked, the rack is located in the crossbar, and when the fixed bar and the pull rod are interlocked, the rack extends out of the crossbar and its end is accommodated in the second snap slot, the third snap slot, and the fourth snap slot.

A toolbox comprising a toolbox body and a pull rod having a removable structure mounted on the toolbox body as described in any of the above.

Compared with the existing technology, this utility model has the following beneficial technical effects.

The utility model provides a removable structure of the pull rod, by installing a push button on the plug head can be pushed inside and outside, the top of the push button is also provided with a bump, and the top of the plug head U-shaped slot set with two fixed slots for limiting, so that the push button between the first position and the second position to move, when the bump is stuck in the first fixed slot, the push button can form an interference with the fixed rod, the pull rod fixed at a set height, when the bump is stuck in the second fixed slot, the push button and the fixed rod disengaged, easy to remove the whole pull rod from the inside of the fixed rod, so as to adapt to the height of the trunk of the car, simple and intuitive operation, easy to use.

BRIEF DESCRIPTION OF THE DRAWINGS

In order to illustrate the technical solutions of the present application more clearly, the following is a brief description of the accompanying drawings to be used in the description of the embodiments. It is obvious that the accompanying drawings in the following description are only some of the embodiments of the present application, and other accompanying drawings can be obtained from these drawings without any creative work for a person of ordinary skill in the art, among which.

FIG. 8 is a perspective view of a pull rod assembly combined to a toolbox according to this disclosure.

DETAILED DESCRIPTION OF THE PREFERRED EMBODIMENTS

Figure 1:
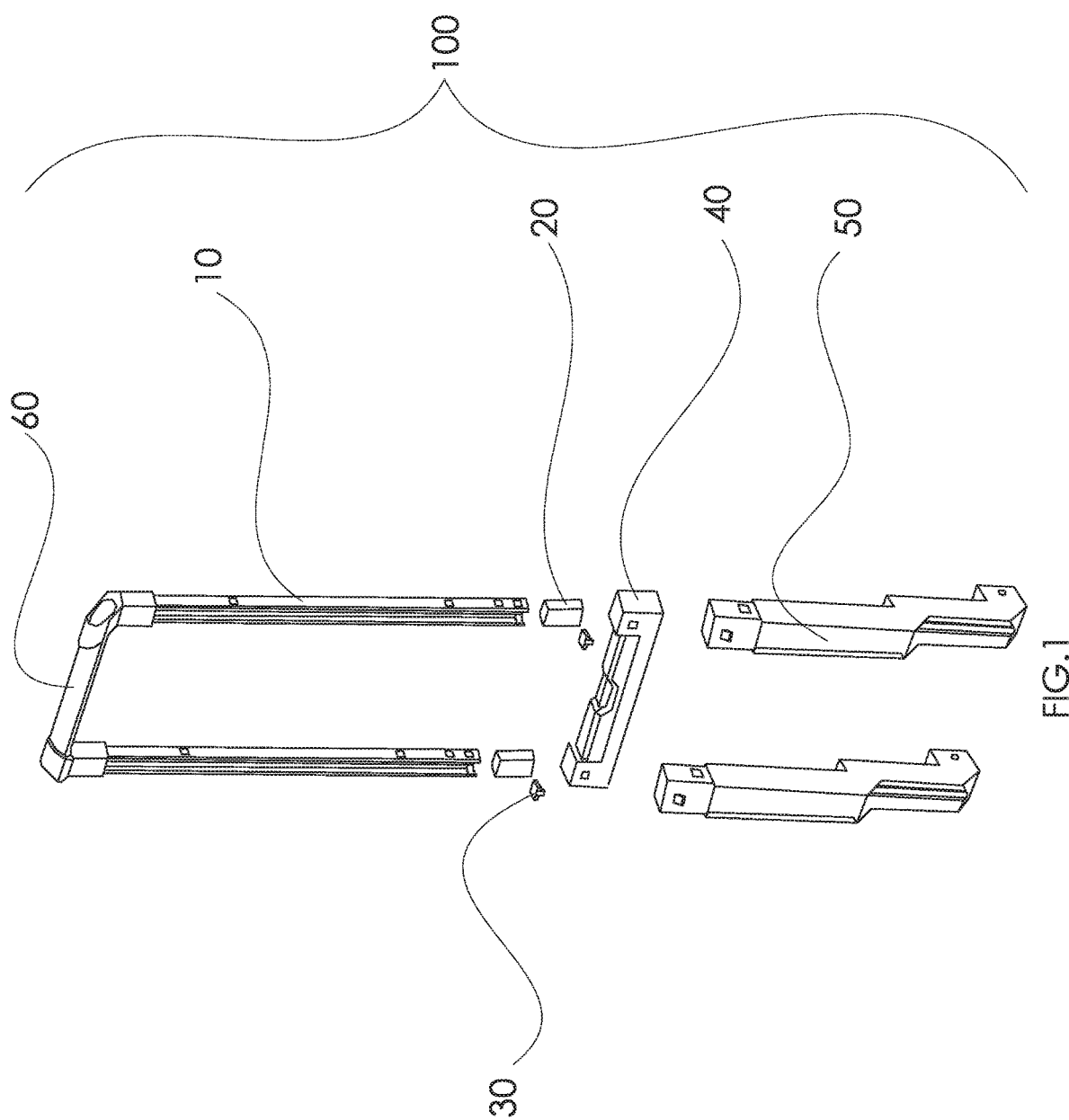
FIG. 1 is an exploded perspective view of Pull rod with removable structure.

Referring to FIG. 8, disclosed is a pull rod assembly 100 combined to a toolbox 102 on which a detachable pull rod 10 is installed. The toolbox 102 is adaptable to the height of the trunk of a car, simple and intuitive to operate, and easy to use. Specifically, with reference to FIG. 1, the pull rod 10 with detachable structure includes a pull rod 10, a plug 20, a push button 30, a crossbar 40, a fixed rod 50, and a handle 60, the handle 60 is mounted on the top of the pull rod 10, the plug 20 is mounted inside the bottom of the pull rod 10, the push button 30 is mounted on the bottom of the plug 20, and the crossbar 40 is set on the top of the fixed rod 50.

The combination of the pull rod 10, the plug 20, and the push button 30 is combined to the crossbar 40 and the fixed rod 50, and the push button 30 has a first position and a second position on the plug 20; when the push button 30 is in the first position on the plug 20, the pull rod 10 can only slide up and down inside the fixed rod 50, and when the push button 30 is in the second position on the plug 20, the pull rod 10 can be removed from inside the fixed rod 50.

Figure 2:
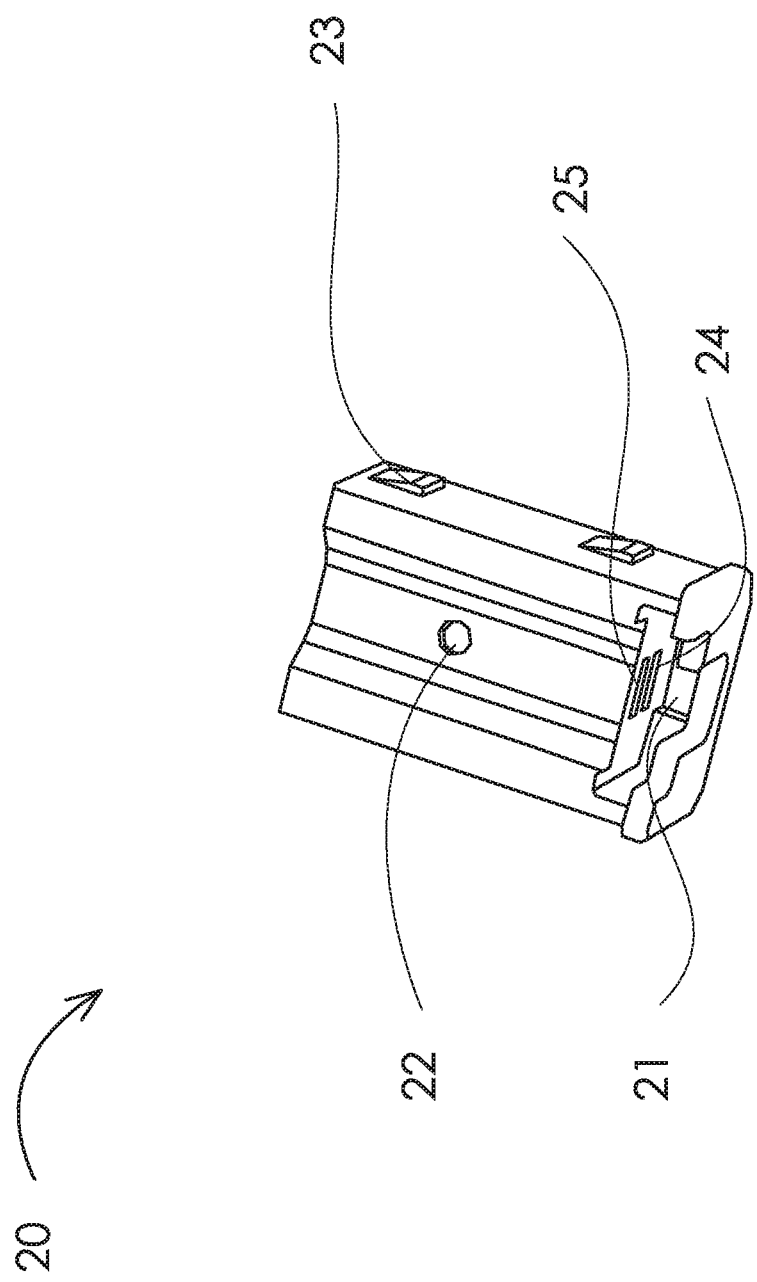
FIG. 2 is a perspective view of plug.

Referring to FIGS. 1 and 2, the plug 20 is a hollow structure with a transverse U-shaped slot 21. Its opening direction of the transverse U-shaped slot 21 faces outward. The push button 30 can mount in the bottom of the U-shape slot 21 and the push button 30 can be placed in the transverse U-shaped slot 21. The top of the transverse U-shaped slot 21 is provided with a first fixing slot 24 and a second fixing slot 25, and the push button 30 can be stuck with the first fixing slot 24 and the second fixing slot 25. The first fixing slot 24 and the second fixing slot 25 are set in parallel. When the push button 30 at the first position, it is stuck with the first fixing slot 24 when the push button 30 at the second position, it is stuck with the second fixing slot 25. The front side of the plug 20 is provided with the first mounting hole 22, and both sides of the plug 20 are provided with snap part 23 for fixing the plug 20 and the pull rod 10; the number of snap part 23 is not limited, and in this embodiment, 2 snap parts 23 are provided.

Figure 3:
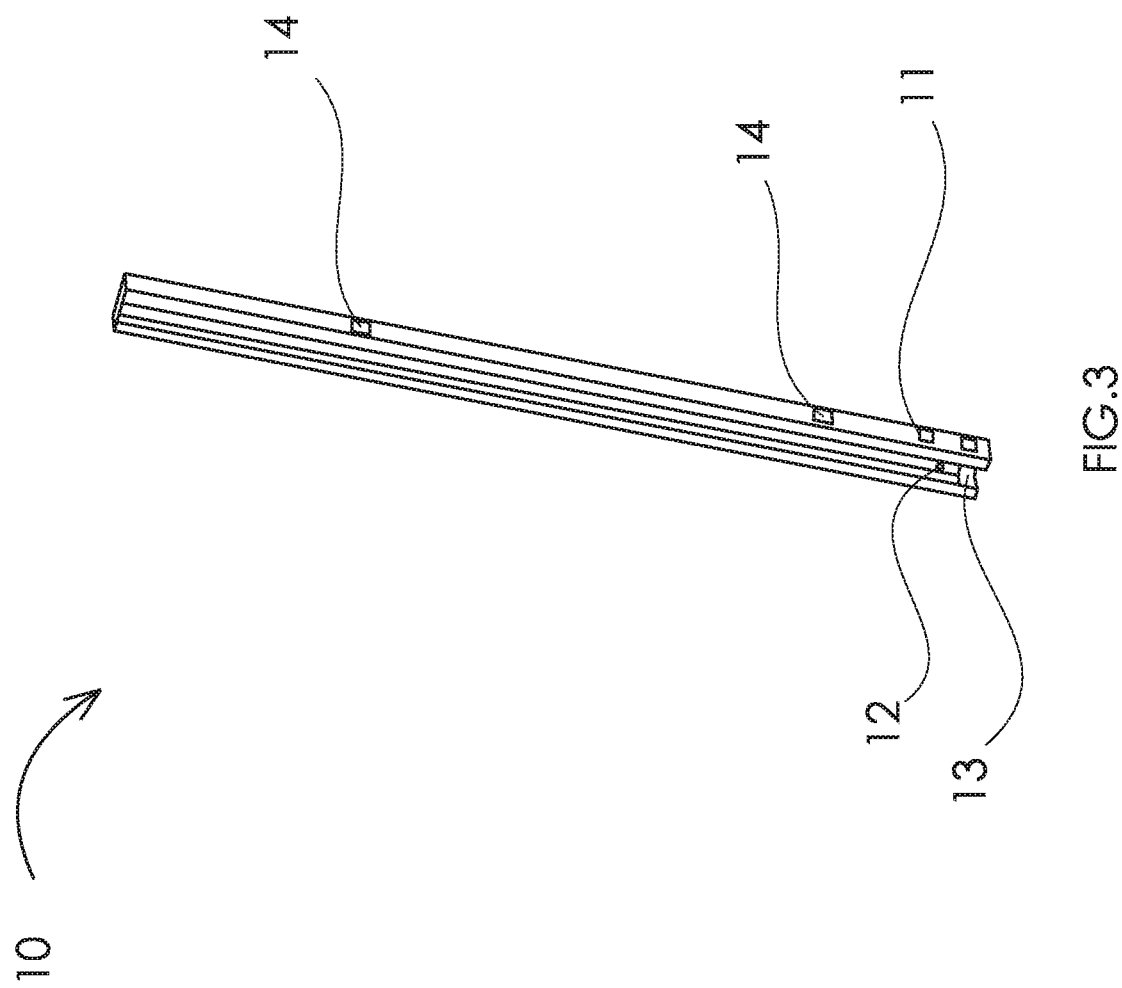
FIG. 3 is a perspective view of pull rod.

Referring to FIGS. 1 and 3, the pull rod 10 is also a hollow structure with a first snap slot 11 on both sides of its bottom matching the position and number of snap parts 23 of the plug 20, and the snap part 23 and the first snap slot 11 snap to each other. Above the first snap slot 11, there are a plurality of fourth snap slots 14 for fixing the pull rod 10 at different heights, and the fourth snap slot 14 can be fixed with the fixed rod 50 through the crossbar 4. The front side of the pull rod 10 is provided with a second mounting hole 12 corresponding to the position and size of the first mounting hole 22 of the plug 20 (shown in FIG. 2). Rivets can be inserted into the first mounting hole 22 and the second mounting hole 12 to further fix the plug 20 and the pull rod 10.

An opening 13 is provided at the bottom of the front side of the pull rod 10 to facilitate the movement of the push button 30 to the first fixing slot 24 and the second fixing slot 25, so that the push button 30 can switch the position between the first fixing slot 24 and the second fixing slot 25 of the plug 20. The plug 20 is secured inside the bottom end of the pull rod 10 by the snap part 23 and the first snap slot 11 and the fit of the rivets to the first mounting hole 22 and the second mounting hole 12.

Figure 6:
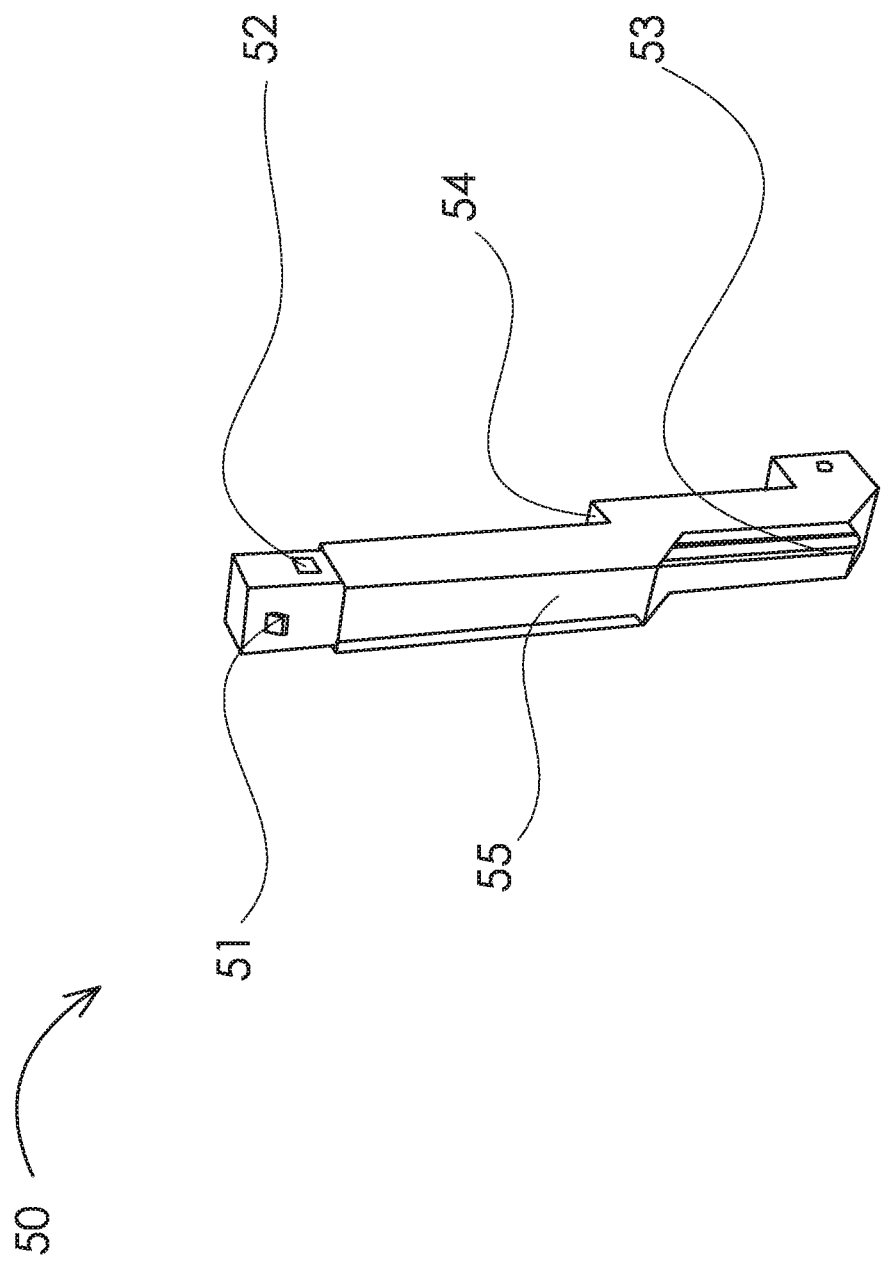
FIG. 6 is a perspective view of fixed rod.
Figure 7:
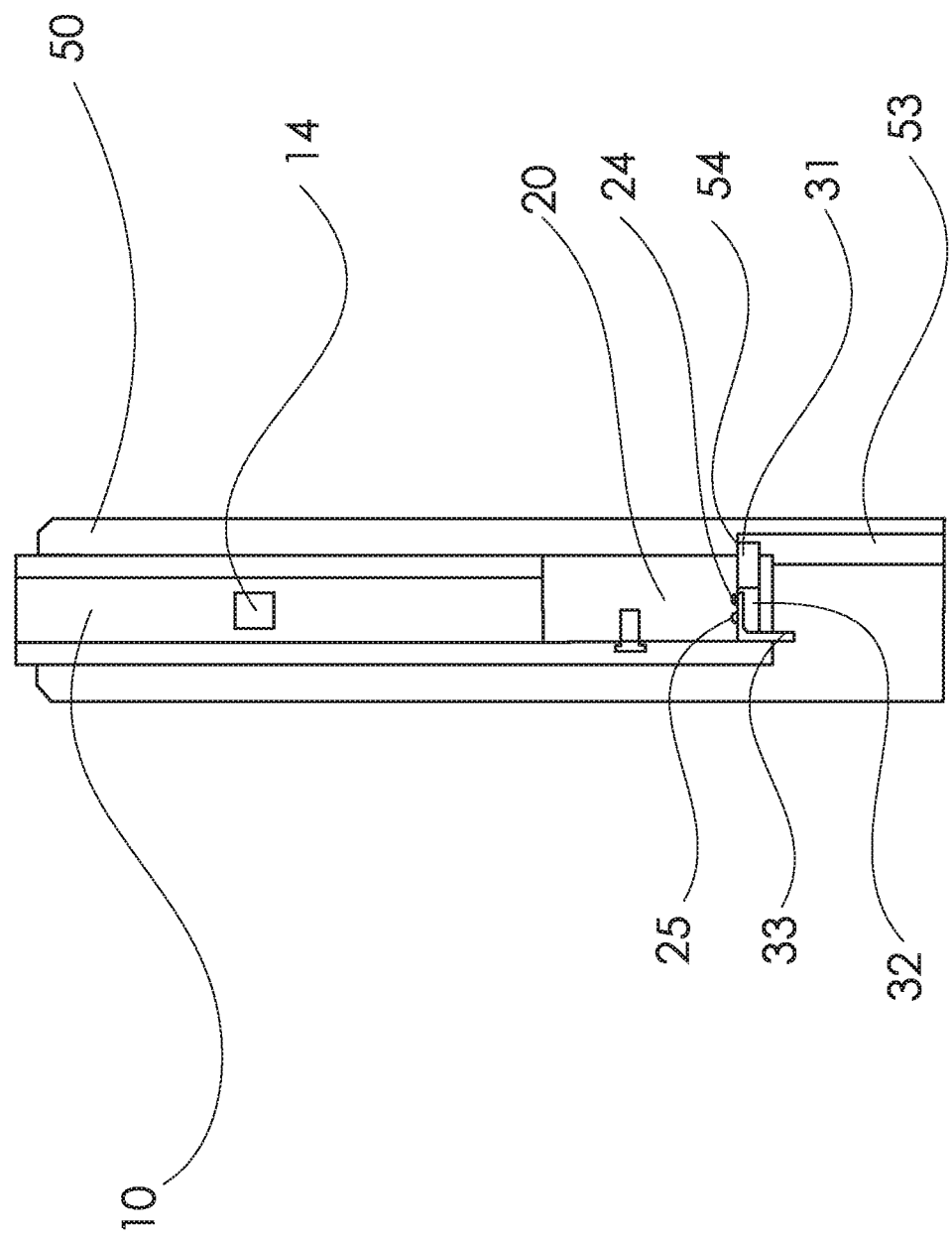
FIG. 7 is the perspective view when push button is in the first position.

Referring to FIGS. 1, 6 and 7, the fixed rod 50 is a hollow structure with a latch 51 on the top front side of the fixed rod 50 for securing to the crossbar 40, a second snap slot 52 on the inside for latching to the pull rod 10, and a section of slide groove 53 extending upward at the bottom. When the bump 34 is connected to the second fixing slot 25, the rod 10 can slide out of the slide groove 53 and can be disconnected from the fixed rod 50.

Figure 4:
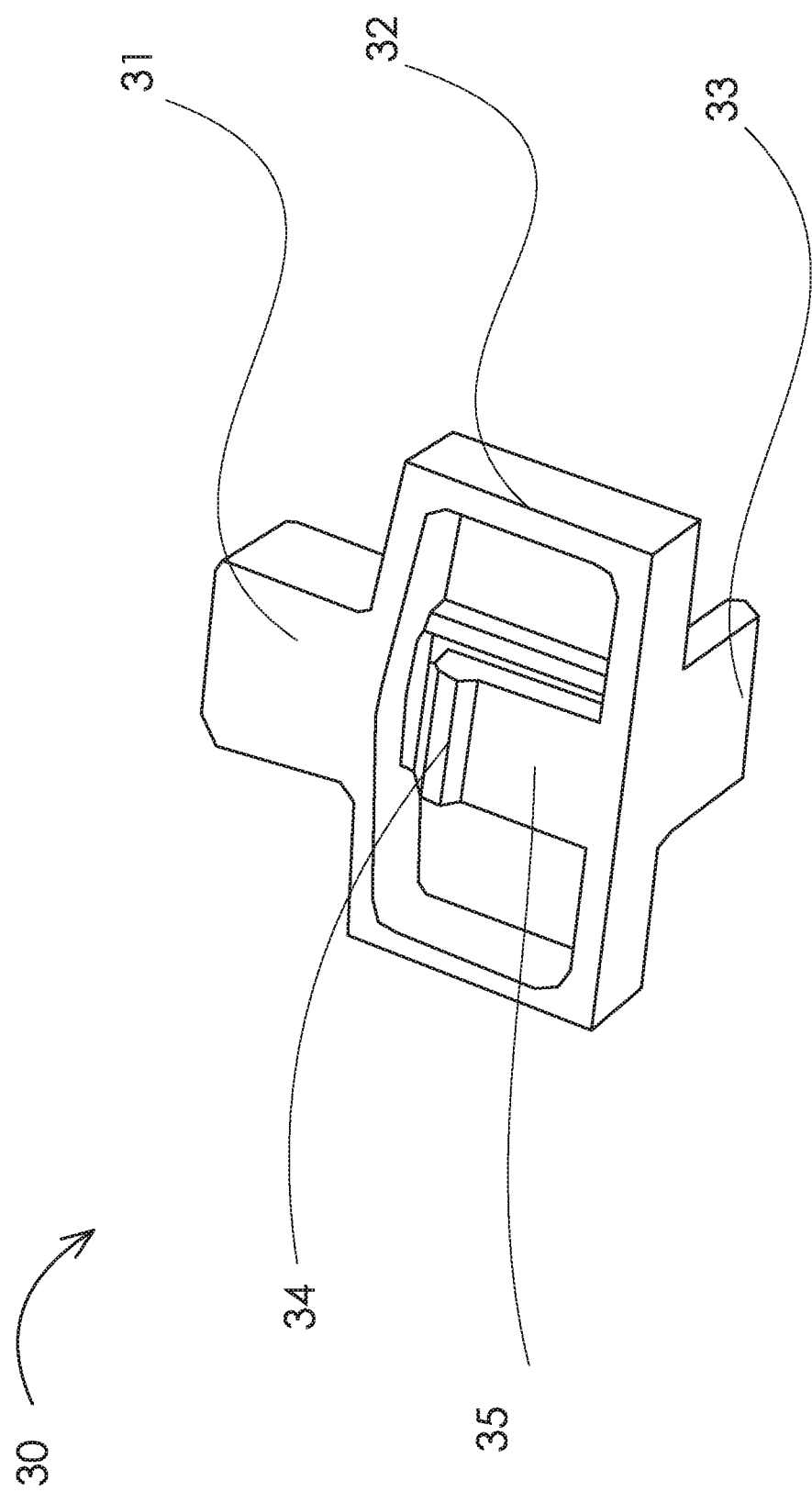
FIG. 4 is a perspective view of push button.

Referring to FIG. 1, FIG. 4 and FIG. 7, the push button 30 includes an attachment part 31, an intermediate part 32, and an action part 33. The action part 33 extends downward and perpendicular to the outer side of the intermediate part 32, the attachment part 31 connected to the intermediate part 32 and protruding from the intermediate part 32, the interior of the intermediate part 32 forming a cavity with a resilient arm 35 and a bump 34 located at the top of the resilient arm 35.

The intermediate part 32 is inserted in the transverse U-shaped slot 21 and can slide relative to the transverse U-shaped slot 21, and the bump 34 snaps into the first fixing slot 24 and the second fixing slot 25 respectively when the intermediate part 32 slides to different positions along the transverse U-shaped slot 21. When the intermediate part 32 slides to the first position along the transverse U-shaped slot 21, the pull rod 10 slides down through and out a tube section 55 to the position of the slide groove 53 and the bump 34 clicks with the first fixing slot 24, and the attachment part 31 extends in the direction of the slide groove 53, and the pull rod 10 can only slide up and down in the slide groove 53 without being retracted into the tube section 55; during the upward sliding of the pull rod 10, the butt surface 54 inside the top of the slide groove 53 can interfere with the attachment part 31, thus confining the pull rod 10 to the set position. Thus, the pull rod 10 is limited to a set height.

When the intermediate part 32 slides to the second position along the transverse U-shaped slot 21, the bump 34 clicks with the second fixing slot 25, and the attachment part 31 retracts in the direction away from the slide groove 53, and the attachment part 31 can be disengaged from the butt surface 54 inside the top of the slide groove 53, and the pull rod 10 can slide up and down or even be removed from a tube section 55, which is the hollow tube part above the top of the slide groove 53. By pulling or pushing the action part 33 in the direction away from the slide groove 53 or near the slide groove 53, the push button 30 can slide inside and outside relative to the transverse U-shaped slot 21, thus driving the push button 30 to switch between the first position and the second position, and then fixing the push button 30 to the set position by snap the bump 34 and the first fixing slot 24 or the second fixing slot 25.

Figure 5:
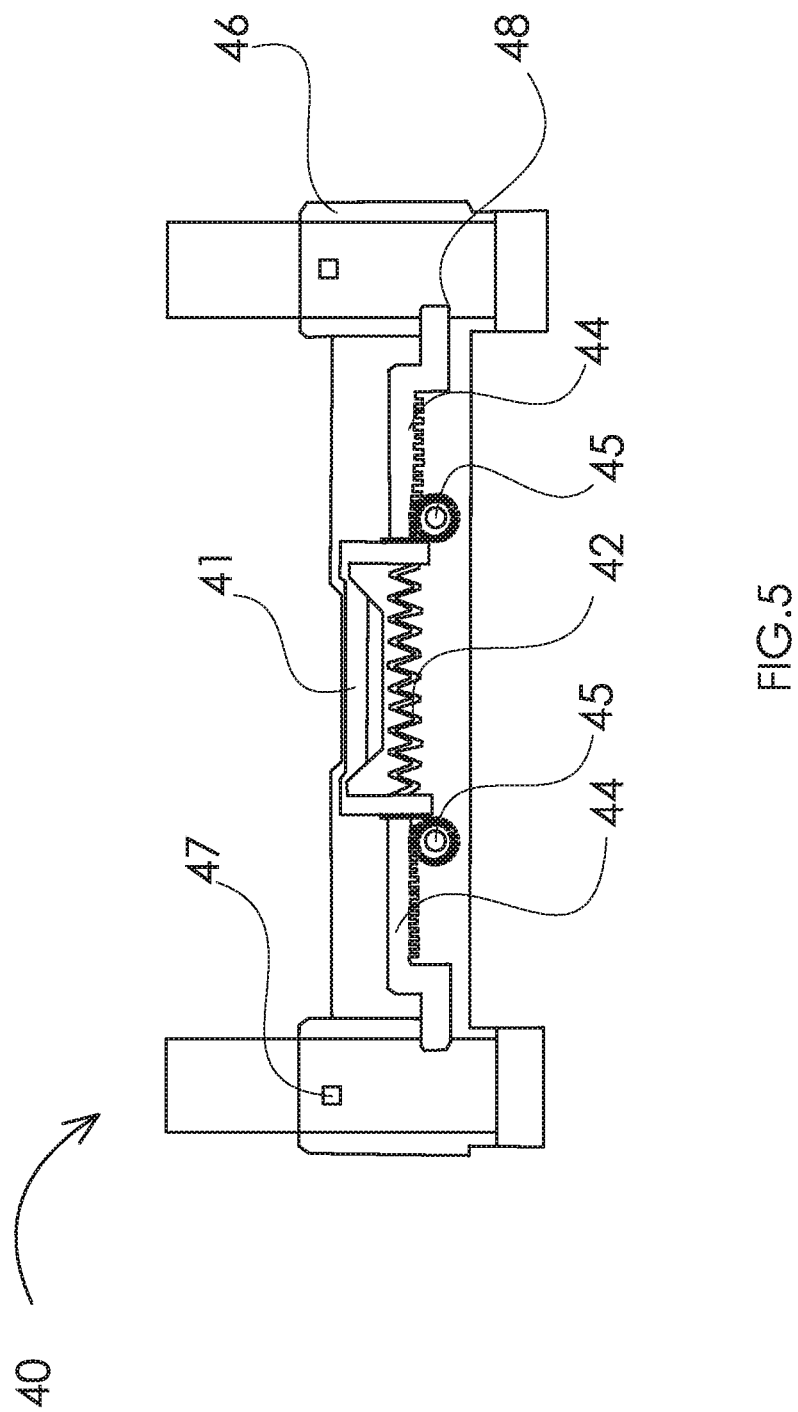
FIG. 5 is a perspective view of crossbar.

Referring to FIGS. 1 and 5, the crossbar 40 is equipped with a button 41, two gears 45 engaged with both sides of the button 41, two racks 44 engaged with the two gears 45, and a spring 42 located between the two racks 44. The button 41 can drive the racks 44 to contract in the crossbar 40 through the gears 45, and the racks 44 can automatically return through the spring 42, so that the fixed rod 50 and the pull rod 10 can unlock and lock each other.

Button 41 can be moved up and down and both sides are equipped with teeth, and both sides of button 41 are equipped with racks 44 on the lower surface of the lateral extension of button 41, and gear 45 is provided below the racks 44 near button 41. Above the teeth on both sides of the button 41, there are also through-holes for the racks 44 to pass through, and the two racks 44 pass through the through-holes and are connected to the spring 42. When the button 41 is pressed and moved downward, the button 41 drives the gears 45 on both sides to rotate close to each other and then drives the two racks 44 to move in the direction close to the button 41, at which time the spring 42 is compressed by the force; when the pressing action is finished, the racks 44 move back to the crossbar 40 far from the button 41 under the action of the recovery force of the spring 42, and the racks 44 drive the gears 45 and rotate in the direction far from the button 41. At the same time, the gear 45 drives the button 41 to move upward and reset.

Both ends of the crossbar 40 are also provided with a fixed part 46. The fixed part 46 is a hollow structure with a lock slot 47 corresponding to the size and position of the latch 51 and a third catch slot 48 corresponding to the position and size of the second catch slot 52, and the latch 51 and the lock slot 47 cooperate to fix the crossbar 40 to the fixed rod 50. The rack 44 moves away from the button 41 through the second snap slot 52 and the third snap slot 48 to engage with the plurality of fourth snap slots 14 on the pull rod 10 to secure the pull rod 10 at different heights; specifically, when the fixed rod 50 and the pull rod 10 are locked, the rack 44 is located within the crossbar 40, and when the fixed rod 50 and the pull rod 10 are unlocked, the rack 44 extends beyond the crossbar 40 and its end is accommodated in the second snap slot 52, the third snap slot 48 and the fourth snap slot 14.

The operation process of the pull rod 10 with removable structure provided by this disclosure is as follows: when using the pull rod 10, first, mount the handle 60 on the top of the pull rod 10 and mount the plug 20 inside the bottom end of the pull rod 10. Next, install the push button 30 in the transverse U-shaped slot 21 of the plug 20, while pulling the action part 33 of the push button 30 in the direction away from the slide groove 53, so that the bump 34 on the push button 30 snaps into the second fixing slot 25 and the resisting attachment part 31 retracts. Next, press the button 41 of the crossbar 40 until the rack 44 is in the retracted state, and at the same time, set the crossbar 40 on the top of the fixed rod 50 so that the lock slot 47 of the crossbar 40 matches well with the latch 51 on the fixed rod 50 to fixes the crossbar 40. Then, insert the pull rod 10 into the fixing part 46 of the crossbar 40 and the fixed rod 50 and continue to insert the pull rod 10 downward. Finally, when the pull rod 10 is slid into the position of the slide groove 53, push the action part 33 of push button 30 in the direction close to the slide groove 53, and the bump 34 snaps into the first fixing slot 24, so that the attachment part 31 extends into the slide groove 53, at which time the installation of the pull rod 10 is completed.

After installing the pull rod 10, the pull rod 10 can be pulled up and down by the handle 60, and the attachment part 31 slides up and down along the slide groove 53 of the fixed rod 50, thus adjusting the height of the pull rod 10. The racks 44 on the crossbar 40 snap with the fourth snap slot 14 on the pull rod 10 with a plurality of different heights, fixing the pull rod 10 at different heights. At the same time, because the attachment part 31 can interfere with the abutting surface inside the top of the slide groove 53, it ensures that the pull rod 10 is in the set height range during the upward movement and the pull rod 10 will not be pulled out; when the attachment part 31 is against the abutting surface at the top of the slide groove 53, the entire pull rod 10 with the removable structure is in the longest length.

When the pull rod 10 needs to be disassembled, first, the action part 33 needs to be pulled in the direction away from the slide groove 53, and the bump 34 snaps into the second fixing slot 25, at which time the attachment part 31 is not in contact with the slide groove 53, and the abutting surface inside the top of the slide groove 53 cannot form an interference with the attachment part 31. Then, press the button 41 on the crossbar 40, so that the rack 44 is in the retracted state and disengaged from the fourth snap slot 14 on the pull rod 10; finally, the pull rod 10 can be disassembled without any obstruction, completing the disassembly of the pull rod 10.

After the above description, it can be known that this disclosure provides a pull rod assembly 100 with a removable pull rod 10, by installing a push button 30 on the plug 20 that can be pushed in and out, and the top of the push button 30 is also provided with a bump 34, and two fixed slots are provided with the top of the U-shaped slot 21 of the plug 20 for limiting the position, so as to make the push button 30 move between the first position and the second position. When the bump 34 is stuck in the first fixing slot 24, the push button 30 can interfere with the fixed rod 50 to fix the pull rod 10 at the suitable height; when the bump 34 is stuck in the second fixing slot 25, the push button 30 is disengaged from the fixed rod 50 to facilitate the removal of the pull rod 10 as a whole from the inside of the fixed rod 50, thus adapting to the height of the trunk, which is simple and intuitive to operate and easy to use.

The above is only an implementation of this application, and is not intended to limit the scope of this application. Any equivalent structure or equivalent process transformation using the contents of this application and the accompanying drawings, or any direct or indirect application in other related technical fields, is included in the scope of patent protection of this application.

The following numbers correspond to the drawings:

| | |
|---|---|
| 10-pull rod; | 40-crossbar; |
| 11-first snap slot; | 41-button; |
| 12-second mounting hole; | 42-spring; |
| 13-opening; | 44-rack; |
| 14-fourth snap slot; | 45-gear; |
| 20-plug; | 46-fixed part; |
| 21-transverse U-shaped slot; | 47-lock slot; |
| 22-first mounting hole; | 48-third snap slot; |
| 23-snap part; | 50-fixed rod; |
| 24-first fixed slot; | 51-latch; |
| 25-second fixed slot; | 52-second snap slot; |
| 30-push button; | 53-slide slot; |
| 31-attachment part; | 54-butt surface |
| 32-intermediate part; | 55-tube section |
| 33-action part; | 60-handle. |
| 34-bump; | |
| 35-elastic arm | |

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A pull rod assembly combined to a toolbox, the pull rod assembly comprising:
    a fixed rod combined to the toolbox;
    a pull rod slidingly engageable in the fixed rod;
    a plug mounted inside a bottom end of the pull rod;
    a push button mounted at a bottom of the plug, wherein the push button has a first position and a second position with respect to the plug; wherein when the push button is in the first position with respect to the plug, the pull rod is slidable up and down inside the fixed rod, and wherein when the push button is located in the second position with respect to the plug, the pull rod is capable of being removed from the fixed rod; and
    wherein the plug further comprises a transverse U-shaped slot at a bottom of the plug for mounting the push button therein, wherein the transverse U-shaped slot is provided with a first fixed slot and a second fixed slot at the top, and wherein when the push button is in the first position, the push button is seated with the first fixed slot, and when the push button is in the second position, the push button is seated with the second fixed slot.

2. The pull rod assembly of claim 1, wherein the push button further comprises an intermediate part, an attachment part connected to the intermediate part and protruding from the intermediate part, an elastic arm located in the intermediate part, and a bump located at the top of the elastic arm.

3. The pull rod assembly of claim 2, wherein the intermediate part is inserted in the transverse U-shaped slot and is capable of sliding transversely relative to the transverse U-shaped slot; when the intermediate part slides along the transverse U-shaped slot to a first position, the bump is seated in the first fixed slot, and the attachment part protrudes from the transverse U-shaped slot, and when the intermediate part slides along the transverse U-shaped slot to a second position, the bump is seated in the second fixed slot and the connecting part is retracted in the transverse U-shaped slot.

4. The pull rod assembly of claim 2, wherein the push button further comprises an action part extending downward and perpendicular to the intermediate part, wherein the action part driving the push button to switch between a first position and a second position.

5. The pull rod assembly of claim 2, wherein the push button further comprises a cavity formed in the intermediate part and the elastic arm is located in the cavity.

6. The pull rod assembly of claim 1, wherein the fixed rod is provided with a tube section and a slide groove below the tube section and with a butt surface formed between the upper tube section and the slide groove of the fixed rod; wherein when the push button is in the first position, the pull rod can slide up and down on the slide groove, and the butt surface interferes with the push button to prevent the pull rod from being removed from the slide groove.

7. The pull rod assembly of claim 1, and further comprising a crossbar set outside the fixed rod, wherein the crossbar is provided with a button, two gears meshed with both sides of the button, two racks meshed with the two gears, and a spring connected to the two racks, wherein the button being able to drive the racks to contract in the crossbar by the gears, and wherein the racks being able to automatically return by means of the spring, so that the fixed rod and the pull rod are unlocked and locked to each other.

8. The pull rod assembly of claim 7, wherein the fixed rod is provided with a second snap slot, the crossbar is provided with a third snap slot, and the pull rod is provided with a plurality of fourth snap slots; and wherein when the fixed rod and the pull rod are interlocked, the rack is located in the crossbar, and when the fixed rod and the pull rod are interlocked, the rack protrudes from the crossbar and its end accommodates in a second snap slot, a third snap slot and a fourth snap slot.

9. A toolbox comprising:
    a toolbox body;
    a fixed rod combined to the toolbox body;
    a pull rod slidingly engageable in the fixed rod;
    a plug mounted inside a bottom end of the pull rod; and
    a push button mounted at a bottom of the plug, wherein the push button has a first position and a second position with respect to the plug; wherein when the push button is in the first position with respect to the plug, the pull rod is slidable up and down inside the fixed rod, and wherein when the push button is located in the second position with respect to the plug, the pull rod is capable of being removed from the fixed rod; and
    wherein the plug further comprises a transverse U-shaped slot at a bottom of the plug for mounting the push button therein, wherein the transverse U-shaped slot is provided with a first fixed slot and a second fixed slot at the top, and wherein when the push button is in the first position, the push button is seated with the first fixed slot, and when the push button is in the second position, the push button is seated with the second fixed slot.

10. The toolbox of claim 9, wherein the push button further comprises an intermediate part, an attachment part connected to the intermediate part and protruding from the intermediate part, an elastic arm located in the intermediate part, and a bump located at the top of the elastic arm.

11. The toolbox of claim 10, wherein the intermediate part is inserted in the transverse U-shaped slot and is capable of sliding transversely relative to the transverse U-shaped slot; when the intermediate part slides along the transverse U-shaped slot to a first position, the bump is seated in the first fixed slot, and the attachment part protrudes from the transverse U-shaped slot, and when the intermediate part slides along the transverse U-shaped slot to a second position, the bump is seated in the second fixed slot and the connecting part is retracted in the transverse U-shaped slot.

12. The toolbox of claim 10, wherein the push button further comprises an action part extending downward and perpendicular to the intermediate part, wherein the action part driving the push button to switch between a first position and a second position.

13. The toolbox of claim 10, wherein the push button further comprises a cavity formed in the intermediate part and the elastic arm is located in the cavity.

14. The toolbox of claim 9, wherein the fixed rod is provided with a tube section and a slide groove below the tube section and with a butt surface formed between the upper tube section and the slide groove of the fixed rod; wherein when the push button is in the first position, the pull rod can slide up and down on the slide groove, and the butt surface interferes with the push button to prevent the pull rod from being removed from the slide groove.

15. The toolbox of claim 9, and further comprising a crossbar set outside the fixed rod, wherein the crossbar is provided with a button, two gears meshed with both sides of the button, two racks meshed with the two gears, and a spring connected to the two racks, wherein the button being able to drive the racks to contract in the crossbar by the gears, and wherein the racks being able to automatically return by means of the spring, so that the fixed rod and the pull rod are unlocked and locked to each other.

16. The toolbox of claim 15, wherein the fixed rod is provided with a second snap slot, the crossbar is provided with a third snap slot, and the pull rod is provided with a plurality of fourth snap slots; and wherein when the fixed rod and the pull rod are interlocked, the rack is located in the crossbar, and when the fixed rod and the pull rod are interlocked, the rack protrudes from the crossbar and its end accommodates in a second snap slot, a third snap slot and a fourth snap slot.

* * * * *